J. C. HENDERSON.
METHOD OF PRODUCING COMPOUND METALS.
APPLICATION FILED DEC. 27, 1919.

1,392,416.

Patented Oct. 4, 1921.

INVENTOR
J. C. HENDERSON
BY
Bartlett Brownell
ATTORNEYS

UNITED STATES PATENT OFFICE.

JOHN CLIFTON HENDERSON, OF NEW YORK, N. Y., ASSIGNOR TO DRIVER-HARRIS COMPANY, OF HARRISON, NEW JERSEY, A CORPORATION OF NEW JERSEY.

METHOD OF PRODUCING COMPOUND METALS.

1,392,416.   Specification of Letters Patent.   Patented Oct. 4, 1921.

Application filed December 27, 1919. Serial No. 347,829.

*To all whom it may concern:*

Be it known that I, JOHN C. HENDERSON, a citizen of the United States, residing at New York, county and State of New York, have invented a certain new and useful Improvement in Methods of Producing Compound Metals, of which the following is a full, clear, and exact description.

My invention relates to the method of producing compound metals such for instance as a sheet or bar composed of two or more layers of dissimilar metals or a core and sheathing of dissimilar metals and has for its object to provide a method of uniting a plurality of metallic substances together so as to form an integral structure which can be subsequently rolled, hammered, forged or drawn without danger of the several portions separating from one another.

Heretofore various attempts have been made to produce such a product but although there has been a great demand I am not aware of any method of producing the product satisfactorily on account of manufacturing difficulties involved and defects which are present in the results produced by the old methods.

Figure 1:
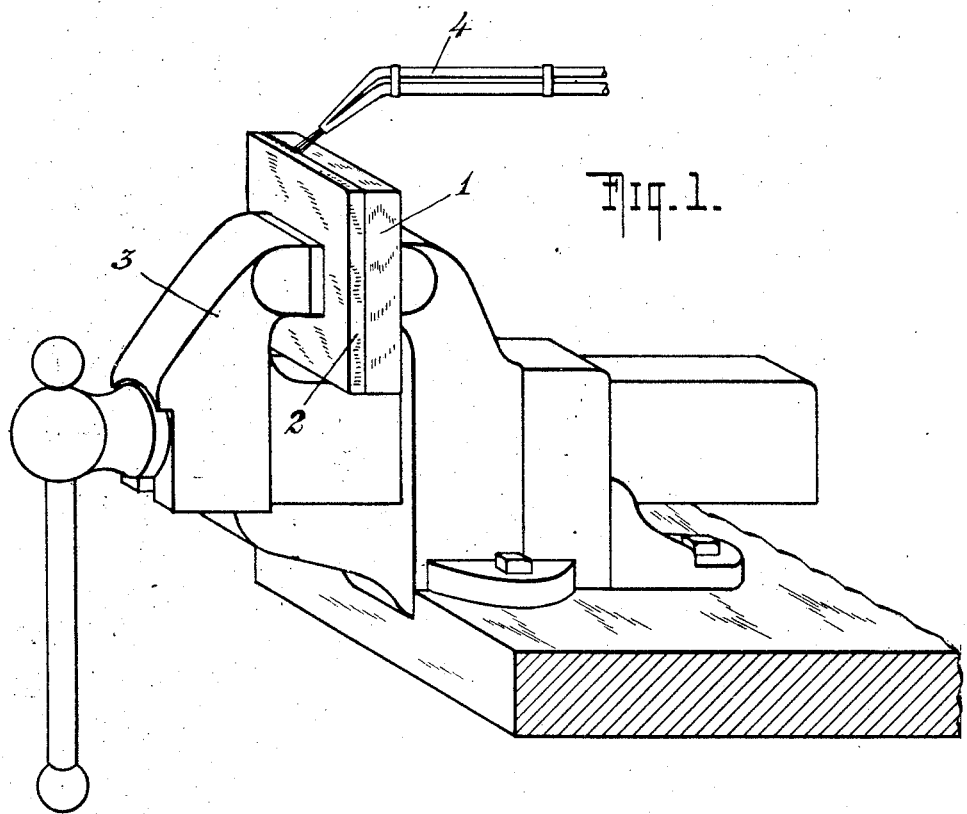
Figure 2:
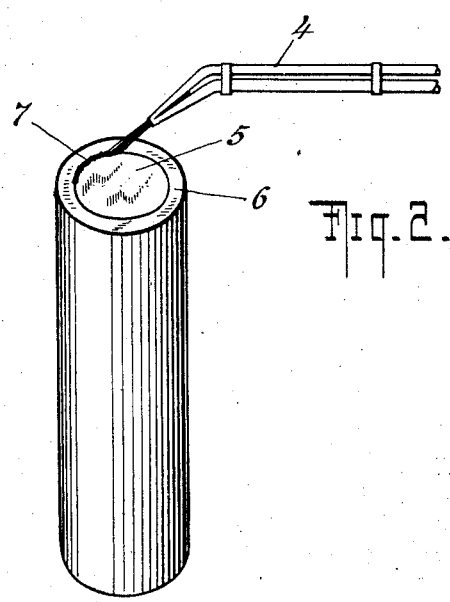

The following is a description of an embodiment of my invention, reference being had to the accompanying drawings, which show important steps in my process, Figure 1 showing two sheet-bars or slabs clamped together in superimposed relation and being prepared for further treatment in accordance with one step in my invention, and Fig. 2 shows a step in making a coated rod or wire according to my method.

Referring more particularly to the drawings, 1 is a sheet-bar or slab of steel or other suitable metal. 2 is a dissimilar metallic sheet-bar or slab to be joined to the sheet-bar 1. Sheet-bar 2 may be a sheet composed of an alloy such as described in my Patent No. 1,190,652, dated July 11, 1916, or of nickel, or may be of various other metals or alloys. In carrying out my method in its preferred form I mill or otherwise clean and even one face of each sheet-bar. In the further carrying out of my process I place these sheet-bars one on top of the other, with the cleaned faces in contact with one another. These faces are so clean and even that when they are in contact with one another they make a very close contact, leaving between them a minimum of air. In order to still further exclude the air I clamp them together, as shown, by a clamp 3 and in order to prevent the entrance of air at any further step in my process, I heat the edges of the sheet-bars by means of a local welding heat sufficiently to slightly fuse the exterior surface thereof so that the edges weld together. For this purpose I employ the flame of an oxy-acetylene torch 4, or I may use the arc of an electric welding implement. As is usual in oxy-acetylene welding, additional metal may be fused and mingled with the fused metallic surfaces of the edges, such for instance as iron where one of the bars is of steel or iron. In this way the entire adjacent peripheries of the sheet-bars are secured together so as to produce a perfect air seal at all points, preventing any further ingress of air between the sheet-bars. This seal is as refractory as at least the plate having the lowest coefficient of melting. The local weld also holds the bars together after the clamps have been removed yielding so as to compensate for the effects of the difference in the coefficients of expansion of the two bars. When the sheet-bars have thus been sealed, I remove them from the clamp and place them in a furnace and heat them to a temperature which is sufficient to soften and dilate the crystalline structures of the opposing faces so that when they are sufficiently pressed together they will unite and while in this condition I remove them from the furnace and subject them to a compacting action by hammering or pressing. A few blows of a steam hammer or a corresponding pressure causes the metallic faces of the two bars to unite so as to form a permanent connection. After they are thus united they can be subjected to either hot or cold rolling so as to reduce the thickness to the desired dimensions in the ordinary manner. In securing the alloy of my Patent No. 1,190,652 to steel, I heat the plates whose edges have been locally welded together to a temperature of approximately 1800° F. or thereabout and then subject them to the steam hammer. In uniting nickel to steel I proceed in a similar manner.

When it is desired to coat a sheet-bar on both sides, both sides of that bar are milled and properly prepared secondary sheets are applied to the two sides, being clamped thereto and having their edges locally welded so as to produce the desired seal. They are then heated and treated as before described.

The products above referred to are suitable for making containers of various sorts and for other obvious purposes.

In making a product having a core entirely surrounded by an adhering coating, I form a round metallic core 5 having a thoroughly cleaned and even surface and a tubular metallic sheath 6 therefor having a corresponding clean and smooth bore and fit the tubular portion over the core tightly and then by means of the oxy-acetylene torch or the electric welding implement form local welds 7 at the lines dividing the two metals on the two ends so as to form complete seals. I then heat this product to the proper temperature to dilate the crystalline structures of the metals and forge or roll them under suitable pressure so that their opposing surfaces unite. I then roll and draw them into the desired shape. In this way a wire can be formed having a core and coating integrally united.

When the core is of steel and the coating is of a heat or acid resisting composition such as described in my said patent, and the compound metal is drawn into wire, a heat and acid resisting wire is obtained having greater tensile strength than if it were made entirely of the heat and acid resisting material. When I desire to make acid resisting coiled springs I shape this wire into the form of a spring of any desired shape and after being so shaped heat it and suddenly cool it so as to temper the steel core, producing an acid resisting spring and one not liable to be corroded by the action of corroding fumes and vapors.

In a similar manner I make flat springs having a tempered steel center and faced with acid resisting material united thereto.

It is to be noted that in carrying out my process no flux or welding compound is necessary.

In the drawing I have shown the clamping means as an ordinary vise, a single clamp such as a vise being sufficient for bars of comparatively small dimensions.

As will be evident to those skilled in the art, my invention permits of various modifications without departing from the spirit thereof or the scope of the appended claims.

What I claim is:

1. The method of uniting together a plurality of dissimilar metallic bodies having corresponding surfaces, which consists in bringing the corresponding surfaces into juxtaposition, locally welding exposed edges together by the application of heat so as to produce a metallic sealing weld, heating the bodies sufficiently to dilate their crystalline structures, and then subjecting them to a compacting action.

2. In the process of uniting two sheets of dissimilar metals, the improvement which consists in locally welding the periphery of one sheet to the other by local application of heat so as to produce a local metallic seal and thereby prevent the entrance of air between the sheets, heating the sheets thus welded and subjecting the extended portions of the sheets to compacting action.

3. In the method of welding two metallic sheets together, the improvement which consists in cleaning and smoothing the opposing faces of the two sheets so as to make them clean and even, welding the periphery of one sheet to the other by local application of heat so as to produce a local welded metallic seal preventing the entrance of air, heating said sheets sufficiently to dilate the crystalline structures of the metals and while in this condition compacting the body portions of the two sheets together.

4. The method of producing compound metals which consists in bringing two flat metallic sheets of different character into close juxtaposition, locally welding the periphery of one sheet to the other by local application of heat so as to produce a local metallic seal and thereby prevent the entrance of air between the sheets, heating the sheets thus secured together sufficiently to dilate the crystalline structures of the metals and while in this condition subjecting them to hammer blows.

JOHN CLIFTON HENDERSON.